(12) United States Patent
Liu et al.

(10) Patent No.: US 11,428,354 B2
(45) Date of Patent: Aug. 30, 2022

(54) PIPELINE ADAPTER

(71) Applicant: Hangzhou Sanhua Research Institute Co., LTD., Hangzhou (CN)

(72) Inventors: Shifeng Liu, Hangzhou (CN); Lin-Jie Huang, Hangzhou (CN); Xu Li, Hangzhou (CN); Wenqing Chen, Hangzhou (CN); Mei Wang, Hangzhou (CN); Li Li, Hangzhou (CN); Junqi Dong, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 241 days.

(21) Appl. No.: 16/627,498

(22) PCT Filed: Aug. 22, 2018

(86) PCT No.: PCT/CN2018/101780
§ 371 (c)(1),
(2) Date: Dec. 30, 2019

(87) PCT Pub. No.: WO2019/042204
PCT Pub. Date: Mar. 7, 2019

(65) Prior Publication Data
US 2020/0158270 A1 May 21, 2020

(30) Foreign Application Priority Data
Aug. 31, 2017 (CN) .......................... 201710769820.0
Jul. 11, 2018 (CN) .......................... 201810758683.5

(51) Int. Cl.
*F16L 23/024* (2006.01)
*F16L 23/18* (2006.01)

(52) U.S. Cl.
CPC ............. *F16L 23/024* (2013.01); *F16L 23/18* (2013.01)

(58) Field of Classification Search
CPC ..... F16L 23/024; F16L 23/18; F16L 23/0283; F16L 23/0286; F16L 23/16; F16L 19/0206; F16L 23/032
(Continued)

(56) References Cited
U.S. PATENT DOCUMENTS
612,455 A * 10/1898 Gore .............................. 285/368
924,039 A * 6/1909 Clark ............................ 285/363
(Continued)

FOREIGN PATENT DOCUMENTS
CN 2283174 Y 6/1998
CN 203272775 U 11/2013
(Continued)

*Primary Examiner* — Zachary T Dragicevich
*Assistant Examiner* — William S. Choi
(74) *Attorney, Agent, or Firm* — Cheng-Ju Chiang

(57) ABSTRACT

The present application provides a pipeline adapter including a first connection block, a second connection block, a fastener and a seal ring. The first connection block is provided with a first channel and a first annular positioning groove disposed around the first channel. The second connection block is provided with a second channel communicating with the first channel and a second annular positioning platform fitting inside the first annular positioning groove. The second annular positioning platform is disposed around the second channel. The fastener connects the first connection block to the second connection block. The seal ring fits between the first annular positioning groove and the second annular positioning platform. The pipeline adapter is convenient to use, has a favorable sealing effect, and facilitates pipeline connection of a refrigeration system.

20 Claims, 7 Drawing Sheets

(58) Field of Classification Search
USPC .................................. 285/363, 368, 412, 413
See application file for complete search history.

(56) References Cited

U.S. PATENT DOCUMENTS

| | | | | |
|---|---|---|---|---|
| 1,178,714 | A | * | 4/1916 | Griffin .................... F16L 23/16 |
| | | | | 285/363 |
| 2,922,666 | A | * | 1/1960 | Lange ........................... 285/363 |
| 3,219,369 | A | * | 11/1965 | Little ...................... F16L 23/18 |
| | | | | 285/363 |
| 3,542,381 | A | * | 11/1970 | Hait |
| 5,553,902 | A | * | 9/1996 | Powers |
| 5,997,049 | A | * | 12/1999 | Kingsford |
| 6,994,380 | B2 | * | 2/2006 | Cooke, Jr. |
| 7,497,482 | B2 | * | 3/2009 | Sugiyama |
| 10,204,806 | B2 | * | 2/2019 | Emami |
| 2003/0080554 | A1 | | 5/2003 | Schroeder et al. |
| 2003/0122377 | A1 | * | 7/2003 | Northrop ..................... 285/363 |
| 2007/0236008 | A1 | | 10/2007 | Kim et al. |
| 2009/0115188 | A1 | | 5/2009 | Howard |
| 2015/0054276 | A1 | | 2/2015 | Alsup et al. |
| 2015/0362107 | A1 | | 12/2015 | Otosaka |

FOREIGN PATENT DOCUMENTS

| | | | |
|---|---|---|---|
| CN | 103574197 | A | 2/2014 |
| CN | 203488880 | U | 3/2014 |
| CN | 104048125 | A * | 9/2014 |
| CN | 203907068 | U | 10/2014 |
| CN | 104653775 | A | 5/2015 |
| CN | 206055895 | U | 3/2017 |
| CN | 206112358 | U | 4/2017 |
| CN | 106641513 | A | 5/2017 |
| CN | 206221851 | U | 6/2017 |
| CN | 207111262 | U | 3/2018 |
| CN | 207207677 | U | 4/2018 |
| CN | 207364502 | U | 5/2018 |
| DE | 10163931 | A1 | 7/2003 |
| EP | 1843072 | A2 | 10/2007 |
| EP | 2876342 | A2 | 5/2015 |
| KR | 10-1210235 | B1 | 12/2012 |
| WO | 2018/079431 | A1 | 5/2018 |

* cited by examiner

US 11,428,354 B2

PIPELINE ADAPTER

CROSS REFERENCE TO RELATED APPLICATIONS

The present application is a 35 U.S.C. § 371 National Phase conversion of International (PCT) Patent Application No. PCT/CN2018/101780, filed on Aug. 22, 2018, which further claims benefit of a Chinese Patent Application No. 201710769820.0, filed on Aug. 31, 2017 and a Chinese Patent Application No. 201810758683.5, filed on Jul. 11, 2018, the disclosure of which is incorporated by reference herein. The PCT International Patent Application was filed and published in Chinese.

TECHNICAL FIELD

The present application relates to a technical field of manufacturing electrical appliances, and in particular, to a pipeline adapter.

BACKGROUND

Pipelines of a refrigeration system are mostly connected by welding. When the refrigeration system is assembled, professionals need to weld the pipelines with a welding equipment at a scene, which renders relatively cumbersome operations. Therefore, a pipeline adapter needs to be provided to facilitate the pipeline connection of the refrigeration system.

SUMMARY

The present application provides a pipeline adaptor which facilitates the pipeline connecting to a refrigeration system.

In order to achieve the above object, a pipeline adapter is provided according to embodiments of the present application. The pipeline adapter includes a first connection block which is provided with a first channel and a first annular positioning groove. The first annular positioning groove is disposed surrounding the first channel. The first annular positioning groove has a first groove bottom surface, a first groove inner wall surface and a first groove outer wall surface. The first groove bottom surface is connected to the first groove inner wall surface and the first groove outer wall surface. The pipeline adapter includes a second connection block which is provided with a second channel and a second annular positioning platform. The second channel is in communication with the first channel. The second annular positioning platform is fitted in the first annular positioning groove. The second annular positioning platform is disposed surrounding the second channel. The second annular positioning platform has a second end surface, a second inner wall surface and a second outer wall surface. The second end surface is connected to the second inner wall surface and the second outer wall surface. The second outer wall surface mates with the first groove outer wall surface, and the second inner wall surface mates with the first groove inner wall surface. The pipeline adapter includes a fastener which connects the first connection block and the second connection block. The pipeline adapter includes a seal ring fitted between the first annular positioning groove and the second annular positioning platform. The seal ring includes at least a first abutment portion and a second abutment portion. The first abutment portion and the second abutment portion are disposed on opposite sides of the seal ring. The first groove bottom surface at least partially abuts against the first abutment portion, and the second end surface at least partially abuts against the second abutment portion.

According to the pipeline adapter in the embodiments of the present application, by having the first channel be provided by the first connection block, by having the second channel be provided by the second connection block and in communication with the first channel, and by having the first channel and the second channel be respectively connected to pipelines, thereby the pipelines can be connected. And the first connection block is provided with a first annular positioning groove surrounding the first channel, and the second connection block is provided with a second annular positioning platform surrounding the second channel and fitted in the first annular positioning groove, thereby the sealing effect of the first connection block and the second connection block can be improved through the first annular positioning groove and the second annular positioning platform, and it is convenient to use.

In some embodiments, the seal ring includes a protruding portion extending in a circumferential direction of the seal ring. At least one of the second end surface and the first groove bottom surface has a sealing groove, and the sealing groove is adapted to the shape of the protruding portion. Thereby, the area of the sealing surface can be reduced by setting the sealing surface of the seal ring to a non-planar structure, for example, a stepped shape, a convex rib shape etc. The fastener only needs to provide a small pre-tightening force, the seal ring can obtain a larger contact surface pressure.

In some embodiments, at least one of the first abutment portion and the second abutment portion includes a first inclined surface and a second inclined surface. The first inclined surface intersects with the second inclined surface to form the protruding portion. The first inclined surface extends obliquely outward from an inner peripheral surface of the seal ring in an axial direction of the seal ring and extends obliquely outward from the inner peripheral surface of the seal ring in a radial direction of the seal ring. The second inclined surface extends obliquely outward from an outer peripheral surface of the seal ring in the axial direction of the seal ring and extends obliquely inward in the radial direction of the seal ring. At least one of the second end surface and the first groove bottom surface has a third inclined surface and a fourth inclined surface. The third inclined surface and the fourth inclined surface intersect to form the sealing groove, and an angle formed by the third inclined surface and the fourth inclined surface is greater than an angle formed by the first inclined surface and the second inclined surface.

In some embodiments, an arc is adopted for connection transition between the first inclined surface and the second inclined surface, so that an arc surface at the boundary of the first inclined surface and the second inclined surface is formed.

In some embodiments, two protruding portions are respectively provided on two end surfaces of the seal ring. The two end surfaces are spaced apart along the axial direction of the seal ring. Both the second end surface and the first groove bottom surface have the sealing groove adapted to the shape of the protruding portions.

In some embodiments, a cross section of the seal ring in a radial direction is of a stepped shape. Both the second end surface and the first groove bottom wall are of stepped shapes which are adapted to an end surface of the seal ring. The seal ring includes a first tread surface, a second tread surface, a third tread surface, a fourth tread surface, a first kick surface and a second kick surface. An inner peripheral surface of the seal ring is connected to the first tread surface and the third tread surface, respectively. The first kick surface is connected to the first tread surface and the second tread surface, respectively. An outer peripheral surface of the seal ring is connected to the second tread surface and the fourth tread surface, respectively. The second kick surface is connected to the fourth tread surface and the third tread surface, respectively.

In some embodiments, a surface of the first connection block facing towards the second connection block is provided with a first boss which surrounds the first channel. The first annular positioning groove is formed on an end surface of the first boss. A surface of the second connection block facing towards the first connection block is provided with a second groove which surrounds the second channel. The second annular positioning platform is formed at a bottom wall of the second groove in which the first boss fits. The first boss includes a first inner end surface, a first outer end surface and a first outer wall surface. The first inner end surface is connected to an inner peripheral surface of the first channel and the first groove inner wall surface, respectively. The first outer end surface is connected to the first outer wall surface and the first groove outer wall surface, respectively. The second groove has a second groove inner bottom surface, a second groove outer bottom surface and a second groove outer wall surface. The second groove outer bottom surface is connected to the second outer wall surface and the second groove outer wall surface, respectively. The second groove inner bottom surface is connected to an inner peripheral surface of the second channel and the second inner wall surface of the second annular positioning platform, respectively. The second groove outer wall surface mates with the first outer wall surface. The first outer end surface and the second groove outer bottom surface are opposed to each other in an axial direction of the first channel and the second channel. The first inner end surface and the second groove inner bottom surface are opposed to each other in the axial direction of the first channel and the second channel.

In some embodiments, the second groove outer wall surface, the second outer wall surface, the second inner wall surface and the inner peripheral surface of the second channel are arranged in parallel and spaced apart from each other; and the first outer wall surface, the first groove inner wall surface, the first groove outer wall surface and the inner peripheral surface of the first channel are disposed in parallel and spaced apart from each other.

In some embodiments, the first annular positioning groove is recessed from a surface of the first connection block facing towards the second connection block, and the second annular positioning platform protrudes from a surface of the second connection block facing towards the first connection block.

In some embodiments, the first connection block has a first through hole, the second connection block has a second through hole. The fastener is a bolt. The first connection block and the second connection block are connected by the bolt which fits in the first through hole and the second through hole. The first through hole and the first channel are spaced from each other and are axially consistent, and the second through hole and the second channel are spaced from each other and are axially consistent.

In some embodiments, at least one of the first connection block and the second connection block is provided with a stepped portion. The stepped portion is provided on a surface of the first connection block facing towards the second connection block and is spaced from the first channel; and/or, the stepped portion is provided on a surface of the second connection block facing towards the first connection block and spaced from the second channel.

In some embodiments, the first connection block is provided with a positioning recess, and the second connection block is provided with a positioning protrusion fitted in the positioning recess, or the second connection block is provided with a positioning recess, and the first connection block is provided with a positioning protrusion fitted in the positioning recess.

In some embodiments, a stepped portion is provided on a surface of the first connection block facing towards the second connection block. The stepped portion is provided with a positioning protrusion. A surface of the second connection block facing towards the first connection block is provided with a positioning recess that mates with the positioning protrusion.

In some embodiments, materials of the first abutment portion and the second abutment portion include at least expanded graphite.

BRIEF DESCRIPTION OF DRAWINGS

The above and/or additional aspects and advantages of the present application will become apparent and easily understood from the description of the embodiments in conjunction with the following drawings, in which.

Figure 1:
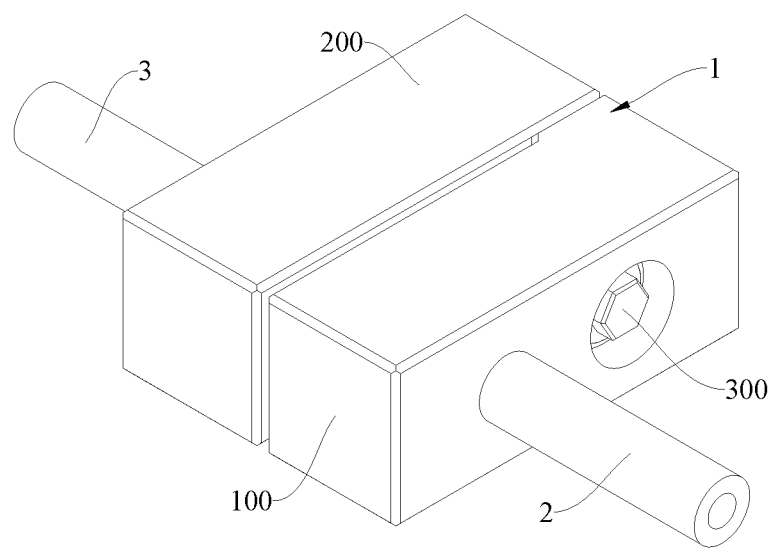
FIG. 1 is a schematic perspective view of a pipeline adapter according to an embodiment of the present application.

Reference numerals: pipeline adapter 1, first connection block 100, first top surface 100a, first bottom surface 100b, first channel 110, inner peripheral surface 111 of the first channel, first annular positioning groove 120, sealing groove 121, third inclined surface 125, fourth inclined surface 126, first groove bottom surface 122, first groove inner wall surface 123, first groove outer wall surface 124, first boss 130, first inner annular portion 1301, first outer annular portion 1302, upper surface 130a, first inner top surface 131, first outer top surface 132, first outer wall surface 133, first through hole 140, positioning protrusion 150, stepped portion 160, second connection block 200, second top surface 200a, second bottom surface 200b, intermediate surface 200c, wall portion 201, second channel 210, inner peripheral surface 211 of the second channel, second annular positioning platform 220, second end surface 221, second inner wall surface 222, second outer wall surface 223, second groove 230, second annular positioning groove 2301, second annular positioning groove 2302, second groove inner bottom surface 231, second groove outer bottom surface 232, second groove outer wall surface 233, second through hole 240, positioning recess 250, fastener 300, seal ring 400, base body 41, cladding layer 42, first abutment portion 401, second abutment portion 402, third abutment portion 403, fourth abutment portion 404, protruding portion 410, first inclined surface 411, second inclined surface 412, first tread surface 413, second tread surface 414, third tread surface 415, fourth tread surface 416, first kick surface 417, second kick surface 418.

DETAILED DESCRIPTION

Hereinafter, embodiments of the present application are described in detail. Examples of the embodiments are shown in the accompanying drawings, wherein the same or similar reference numerals represent the same or similar elements or elements having the same or similar functions throughout. The embodiments described below with reference to the drawings are exemplary and are only used to explain the present application, and should not be construed as limiting the present application. In the description of this application, it should be understood that the orientation or position relationship indicated by the terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial" and "circumferential" etc. is based on the orientation or position relationship shown in the drawings, and is only for the convenience of describing this application and simplifying the description, rather than indicating or implying that the device or element referred to must have a particular orientation, or be constructed and operated in a particular orientation, it cannot be understood as a limitation on this application.

As shown in FIGS. 1 to 18, a pipeline adapter 1 according to embodiments of the present application includes a first connection block 100, a second connection block 200, a fastener 300 and a seal ring 400.

Figure 4:
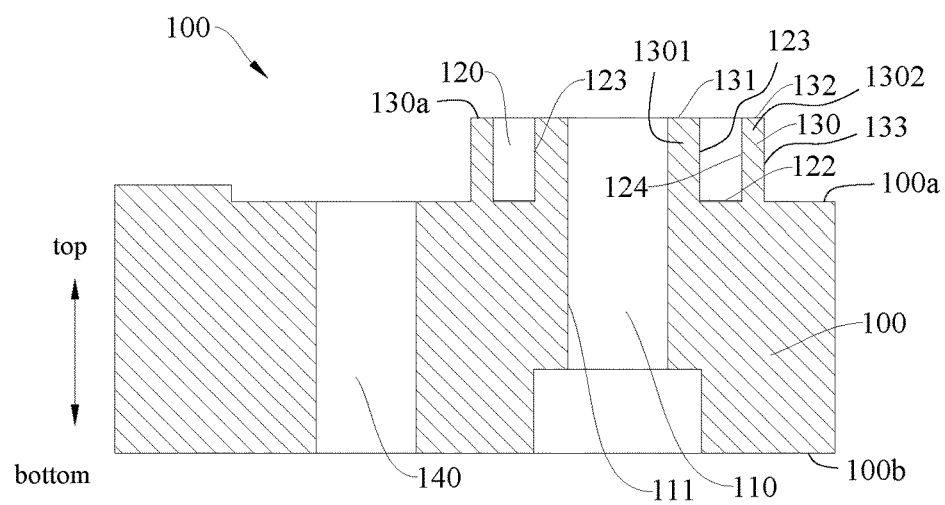
FIG. 4 is a cross-sectional view of a first connection block of a pipeline adapter according to an embodiment of the present application.
Figure 5:
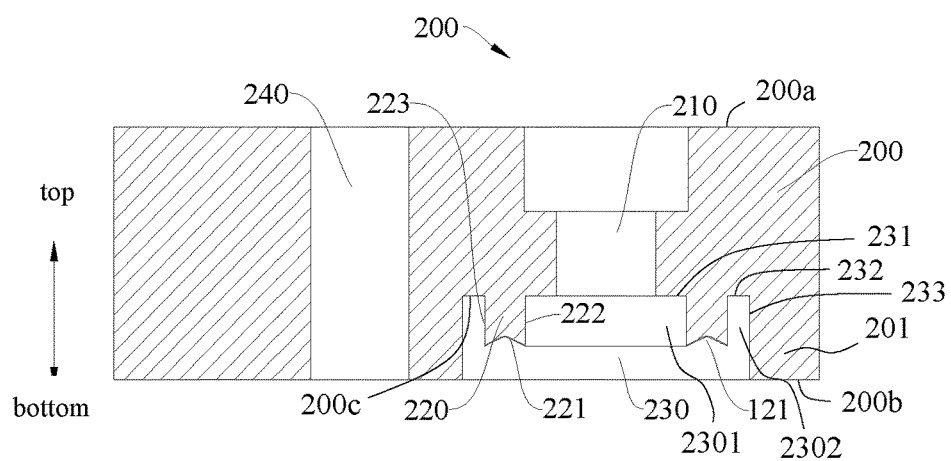
FIG. 5 is a cross-sectional view of a second connection block of a pipeline adapter according to an embodiment of the present application.

As shown in FIGS. 2, 4, 6 and 10, the first connection block 100 includes a first top surface 100a, a first bottom surface 100b opposite to the first top surface 100a, a first boss 130 protruding from the first top surface 100a along a bottom-to-top direction. The first connection block 100 is provided with a first channel 110. In other words, the first channel 110 extends through the first connection block 100 along a thickness direction (a top-to-bottom direction in FIG. 2). The first connection block 100 is also provided with a first annular positioning groove 120 which is disposed around the first channel 110. The first boss 130 has an upper surface 130a and the first annular positioning groove 120 is recessed downwardly from the upper surface 130a. The first connection block 100 has a first groove bottom surface 122, a first groove inner wall surface 123 and a first groove outer wall surface 124. The first groove bottom surface 122 is located inside the first annular positioning groove 120. As shown in FIG. 4, in this embodiment, the first groove bottom surface 122 is located a bottommost of the first annular positioning groove 120. The first groove bottom surface 122 is connected to the first groove outer wall surface 124. Here, it can be understood that the first annular positioning groove 120 is an annular groove. The first annular positioning groove 120 is bounded by the first groove inner wall surface123, the first groove outer wall surface 124 and the first groove bottom surface 122. In this embodiment, the first annular positioning groove 120 is provided around the first channel 110. That is, the first annular positioning groove 120 is not in communication with the first channel 110 on the first connection block 100. In other words, a separation portion is provided between the first groove inner wall surface 123 of the first annular positioning groove 120 and an inner peripheral surface 111 of the first channel 110. Through the separation portion, the first channel 110 is separated from the annular first annular positioning groove 120. In the present embodiment, the first channel 110 extends through the first bottom surface 100b and the upper surface 130a along the bottom-to-top direction. The first boss 130 is separated by the first annular positioning groove 120 to form a first inner annular portion 1301 and a first outer annular portion 1302. The first inner annular portion 1301, the first annular positioning groove 120 and the first outer annular portion 1302 are disposed in sequence along a radial direction of the first channel 110. The first annular positioning groove 120 is separated from the first channel 110 along the radial direction of the first channel 110 by the first inner annular portion 1301.

As shown in FIGS. 2, 5, 7 and 11, the second connection block 200 includes a second top surface 200a, a second bottom surface 200b opposite to the second top surface 200a, an intermediate surface 200c located between the second top surface 200a and the second bottom surface 200b. The second connection block 200 is provided with a second channel 210. In other words, the second channel 210 extends along the thickness direction (the top-to-bottom direction in FIG. 2). In the present embodiment, the second channel 210 extends through the second top surface 200a and the intermediate surface 200c. The second connection block 200 further includes a second groove 230 recessed upwardly from the second bottom surface 200b along the bottom-to-top direction. The second connection block 200 is also provided with a second annular positioning platform 220 protruding from the intermediate surface 200c and extending into the second groove 230. The second channel 210 is in communication with the first channel 110. The second annular positioning platform 220 is disposed around the second channel 210. The second annular positioning platform 220 has a second end surface 221, a second inner wall surface 222 and a second outer wall surface 223. The second end surface 221 is connected with the second inner wall surface 222 and the second outer wall surface 223. That is, the second end surface 221 is connected to both the second inner wall surface 222 and the second outer wall surface 223. The intermediate surface 200c is located between the second top surface 200a and the second bottom surface 200b along the top-to-bottom direction. The second connection block 200 includes a wall portion 201 surrounding the second groove 230. The second end surface 221 is located between the intermediate surface 200c and the second bottom surface 200b along the top-to-bottom direction. The second groove 230 is separated by the second annular positioning platform 220 to form an inner channel 2301 which communicates with the second channel 210 along the bottom-to-top direction and a second annular positioning groove 2301 which is formed between the wall portion 201 and the second annular positioning platform 220. The second annular positioning platform 220, the second annular positioning groove 2301 and the wall portion 201 are disposed in sequence along a radial direction of the inner channel 2301.

Figure 2:
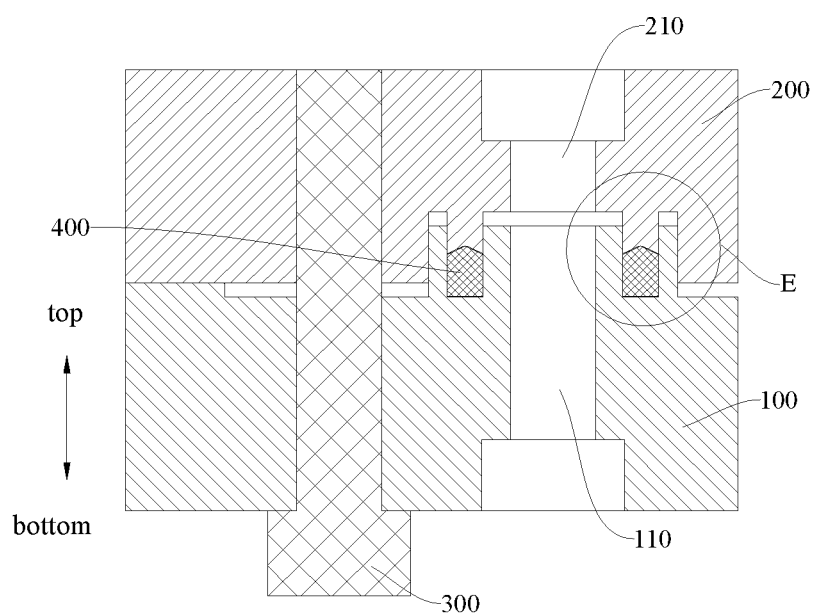
FIG. 2 is a cross-sectional view of a pipeline adapter according to an embodiment of the present application.
Figure 3:
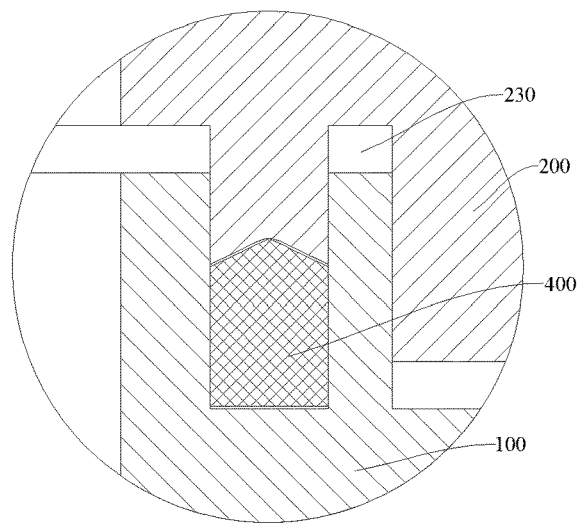
FIG. 3 is a partially enlarged view at the area E in FIG. 2.

As shown in FIGS. 2 and 3, the second annular positioning platform 220 fits in the first annular positioning groove 120, that is, the shape and size of the first annular positioning groove 120 are adapted to the shape and size of the second annular positioning platform 220. The second annular positioning platform 220 protrudes into the first annular positioning groove 120. The second outer wall surface 223 mates with the first groove outer wall surface 124, and the second inner wall surface 222 mates with the first groove inner wall surface 123. Here, it is understood that the first annular positioning groove 120 is provided on the surface of the first connection block 100 facing towards the second connection block 200, and the second annular positioning platform 220 is provided on the surface of the second connection block 200 facing towards the first connection block 100. For example, when the second connection block 200 and the first connection block 100 are sequentially connected along the top-to-bottom direction, the bottom surface of the second connection block 200 is provided with the second annular positioning platform 220, the top surface of the first connection block 100 is provided with the first annular positioning groove 120, and the second annular positioning platform 220 fits in the first annular positioning groove 120. When the second connection block 200 and the first connection block 100 are connected, the first boss 130 of the first connection block 100 is received in the second groove 230 of the second connection block 200; the first outer annular portion 1302 is at least partially inserted in the second annular positioning groove 2302; the second annular positioning platform 220 is at least partially inserted in the first annular positioning groove 120; and the first inner annular portion 1301 is at least partially received in the inner channel 2301. The first inner annular portion 1301 is located inside the second annular positioning platform 220, and the first inner annular portion 1301 abuts against the second annular positioning platform 220 along the radial direction of the inner channel 2301 to prevent the expanded graphite from entering the first channel 110 and/or the second channel 210.

Here, it should be understood that, the phrase "mate with" in the sentence that "the second outer wall surface 223 mates with the first groove outer wall surface 124" means either at least a part of the second outer wall surface 223 is in contact with at least a part of the first groove outer wall surface 124, or at least a part of the second outer wall surface 223 and at least a part of the first groove outer wall surface 124 are opposite to each other and spaced apart from each other along a radial direction of the second annular positioning platform 220, that is, they are not in contact. The phrase "mate with" in the sentence that "the second inner wall surface 222 mates with the first groove inner wall surface 123" can only be that at least a part of the second inner wall surface 222 is in contact with at least a part of the first groove inner wall surface 123 so that the fluid in the first channel 110 and the second channel 210 is prevented from flowing to the outside.

The fastener 300 connects the first connection block 100 and the second connection block 200. In other words, the first connection block 100 and the second connection block 200 are connected by the fastener 300. In some specific embodiments, the fastener 300 is a bolt through which the first connection block 100 and the second connection block 200 are fastened together.

Figure 8:
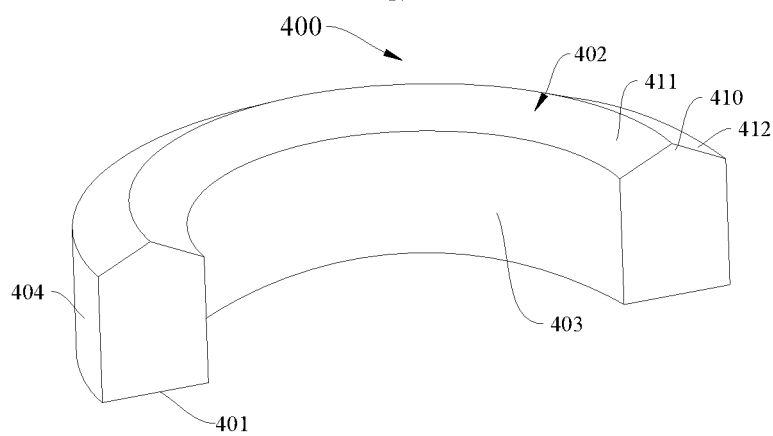
FIG. 8 is a schematic perspective view of a seal ring of a pipeline adapter according to an embodiment of the present application.

The seal ring 400 is fitted between the first annular positioning groove 120 and the second annular positioning platform 220. The seal ring 400 includes a first abutment portion 401 and a second abutment portion 402. The first abutment portion 401 and the second abutment portion 402 are disposed on opposite sides of the seal ring 400. The first abutment portion 401 and the second abutment portion 402 are distributed approximately along a circumferential direction about an axis of the first channel 110. In the axial direction of the first channel 110, the first abutment portion 401 and the second abutment portion 402 are oppositely disposed. The first abutment portion 401 abuts against the first groove bottom surface 122, and the second abutment portion 402 abuts against the second end surface 221. Here, it needs to be understood that the first abutment portion 401 and the second abutment portion 402 may be the lower surface and the upper surface of the seal ring 400, respectively, as shown in FIGS. 2 and 8.

The seal ring 400 further includes a third abutment portion 403 and a fourth abutment portion 404. The third abutment portion 403 and the fourth abutment portion 404 are distributed approximately along the circumferential direction about the axis of the first channel 110. The axis of the third abutment portion 403 and the axis of the fourth abutment portion 404 are substantially parallel to the axis of the first channel 110. The third abutment portion 403 abuts against the first groove inner wall surface 123, and the fourth abutment portion 404 abuts against the first groove outer wall surface 124. Here, it needs to be understood that the third abutment portion 403 and the fourth abutment portion 404 may be the inner peripheral surface and the outer peripheral surface of the seal ring 400, respectively, as shown in FIG. 8.

Specifically, as shown in FIGS. 2 and 3, the seal ring 400 is assembled in the first annular positioning groove 120 and tightly fits between the first annular positioning groove 120 and the second annular positioning platform 220. The first abutment portion 401 (i.e., the lower surface) of the seal ring 400 is closely attached to the first groove bottom surface 122. The second abutment portion 402 (i.e., the upper surface) of the seal ring 400 is closely attached to the second end surface 221. The third abutment portion 403 (i.e., the inner peripheral surface) of the seal ring 400 is closely attached to the first groove inner wall surface 123. The fourth abutment portion 404 (i.e., the outer peripheral surface) of the seal ring 400 is closely attached to the first groove outer wall surface 124. It should be understood here that the shape and size of the seal ring 400 are adapted to the shape and size of the first annular positioning groove 120 and the shape and size of the second annular positioning platform 220, so that the seal ring 400 fits tightly between the first annular positioning groove 120 and the second annular positioning platform 220.

The phrase "abut against" described in the present application includes two meanings: firstly, two objects are in contact; secondly, there is a force between the two objects that is perpendicular to the contact surface. The description of "substantially parallel" and "substantially perpendicular" refer to being parallel and perpendicular within a certain range. For example, it is also considered perpendicular if the angle is within 80° to 90°, and it is also considered parallel if the angle is within 0° to 10°.

In this embodiment, one end of the first channel 110 is possible of being connected to a first pipeline 2, the other end of the first channel 110 is connected to one end of the second channel 210, and the other end of the second channel 210 is possible of being connected to a second pipeline 3. As a result, the first pipeline 2 and the second pipeline 3 are connected to realize pipeline connection through the first channel 110 provided by the first connection block 100 and the second channel 210 provided by the second connection block 200 and in communication with the first channel 110. By providing an annular first annular positioning groove 120 surrounding the first channel 110 on the surface of the first connection block 100 facing towards the second connection block 200, the first channel 110 and the first annular positioning groove 120 are separated. The second connection block 200 is provided with a second annular positioning platform 220 surrounding the second channel 210 and fitted in the first annular positioning groove 120. The second annular positioning platform 220 is fitted in the annular first annular positioning groove 120, so that the sealing performance of the first connection block 100 and the second connection block 200 can be enhanced, and the pipeline adapter 1 is convenient to use.

Figure 12:
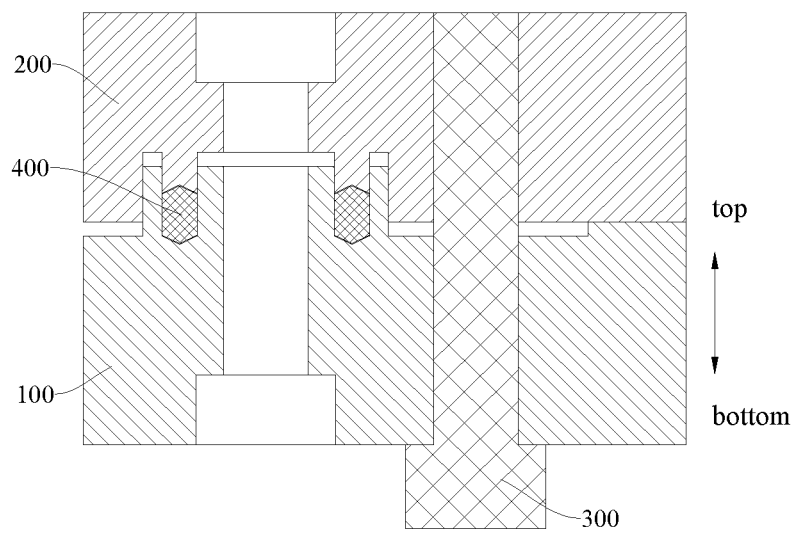
FIG. 12 is a cross-sectional view of a pipeline adapter according to another embodiment of the present application.
Figure 13:
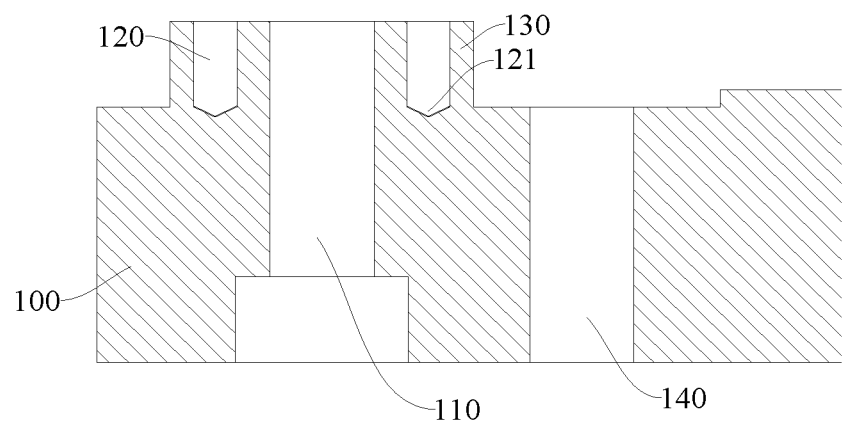
FIG. 13 is a cross-sectional view of a first connection block of a pipeline adapter according to another embodiment of the present application.

In some embodiments, the seal ring 400 has a protruding portion 410 which extends along the circumferential direction of the seal ring 400. At least one of the second end surface 221 and the first groove bottom surface 122 has a sealing groove 121 which is adapted to the shape of the protruding portion 410. In other words, in some specific embodiments, as shown in FIGS. 2 and 8, one end surface (the upper end surface of the seal ring 400 in FIG. 2) of the seal ring 400 adjacent to the second end surface 221 has the protruding portion 410. The second end surface 221 has the sealing groove 121 to fit the protruding portion 410. In other specific embodiments, one end surface (the lower end surface of the seal ring 400 in FIG. 2) of the seal ring 400 adjacent to the first groove bottom surface 122 has the protruding portion 410, and the first groove bottom surface 122 has the sealing groove 121 to fit the protruding portion 410. In some specific embodiments, as shown in FIGS. 12 to 13, one end surface (the upper end surface of the seal ring 400 in FIG. 12) of the seal ring 400 adjacent to the second end surface 221 and one end (the lower end surface of the seal ring 400 in FIG. 12) adjacent to the first groove bottom surface 122 both have the protruding portion 410. The second end surface 221 has the sealing groove 121 to fit one of the protruding portions 410, and the first groove bottom surface 122 has another sealing groove 121 to fit the other of the protruding portions 410.

In this embodiment, the area of the sealing surface can be reduced by setting the sealing surface of the seal ring 400 to a non-planar structure, for example, a stepped shape, a convex rib shape etc. Accordingly, the contact surface of the second end surface 221 and/or the first groove bottom surface 122 and the seal ring 400 is a non-planar structure in order to match the sealing surface of the seal ring 400. Therefore, the fastener only needs to provide a small pre-tightening force, and the seal ring 400 can obtain a larger contact surface pressure, that is, the seal ring 400 has a larger pressure. Here, it is necessary to understand that if the sealing surface of the seal ring 400 of the pipeline adapter 1 is flat, when carbon dioxide is used as the refrigerant, due to the large working pressure of the carbon dioxide, it is easy to cause the pretension force of the two connection blocks away from the bolt to be larger and the pretension force of the other side closer to the bolt to be smaller. As a result, the side of the two connection blocks away from the bolt is prone to be warped, resulting in leakage of the pipeline adapter.

In this embodiment, the first annular positioning groove 120, the second annular positioning platform 220 and the seal ring 400 are provided, and the seal ring 400 is provided with the protruding portion 410, and at least one of the second end surface 221 and the first groove bottom surface 122 is provided with the turned sealing groove 121 which is adapted to fit the shape of the protruding portion 410 and mates with the protruding portion 410, so that the protruding portion 410 and the sealing groove 121 can be used to seal the pipeline adapter 1. Compared with pipe connecting devices in related art, by providing the seal ring 400 with the protruding portion 410, the protruding portion 410 can be used to balance the problem that the fastener 300 is pressurized on one side of the pipeline adapter 1 and the other side of the pipeline adapter 1 receives unevenness and insufficient pretension. Since the contact area of the seal ring 400 with at least one of the first annular positioning groove 120 and the second annular positioning platform 220 is reduced, under the condition that the pressure of the fastener 300 is not changed, the contact surface of the seal ring 400 is increased, therefore the binding force between the seal ring 400 and at least one of the first annular positioning groove 120 and the second annular positioning platform 220 is improved. As a result, the sealing reliability of the pipeline adapter 1 is improved which can make the sealing effect of the seal ring 400 better and improve the working performance of the pipeline adapter 1.

In addition, by providing the seal ring 400 having the protruding portion 410, when the seal ring 400 is pressed, the protruding portion 410 has a characteristic of a sudden change in section, which facilitates the elastic deformation of the seal ring 400 under pressure and improves the elastic deformation ability of the seal ring 400. Therefore, not only can a larger contact surface pressure be obtained by applying a smaller pre-tightening force so as to reduce the pre-tightening force required by the pipeline adapter 1, but also when the first connection block 100 and the second connection block 200 are separated by force, the seal ring 400 can compensate the separation amount of the first connection block 100 and the second connection block 200 by the rebound amount, thereby avoiding leakage of the pipeline adapter 1 and further improving the sealing reliability of the pipeline adapter 1.

In addition, by providing the protruding portion 410 and the sealing groove 121, the sealing performance of the pipeline adapter 1 can be improved. As a result, the pipeline adapter 1 can be applied to a place with high sealing requirements, such as in an air conditioning system using carbon dioxide as a refrigerant. This is beneficial to improve the working performance of the air conditioning system, improve the efficiency of the air conditioning system, and reduce the volume of the air conditioning system. For example, the volume of the compressor, the evaporator and the condenser in the air conditioning system can be reduced, thereby reducing the space occupied by the air conditioning system. It is convenient to set up the air conditioning system and to improve the working reliability and stability of the air conditioning system.

Therefore, in this embodiment, the pipeline adapter 1 has advantages such as convenient use and good sealing effect.

In some embodiments of the present application, as shown in FIGS. 2, 8 and 12, at least one of the first abutment portion 401 and the second abutment portion 402 of the seal ring 400 includes a first inclined surface 411 and a second inclined surface 412. The first inclined surface 411 and the second inclined surface 412 intersect and form the protruding portion 410. The first inclined surface 411 extends obliquely outward from the inner peripheral surface (the third abutment portion 403) of the seal ring 400 along the axial direction of the seal ring 400 and extends obliquely outward along the radial direction of the seal ring 400. The second inclined surface 412 extends obliquely outward from the outer peripheral surface (the fourth abutment portion 404) of the seal ring 400 along the axial direction of the seal ring 400 and extends obliquely inward along the radial direction of the seal ring 400. Here, it can be understood that the direction from the center of the seal ring 400 to the direction away from the center of the seal ring 400 along the axial direction of the seal ring 400 is defined as a direction outward along the axial direction of the seal ring 400. In the radial direction of the seal ring 400, the direction from the center of the seal ring 400 to the direction away from the center of the seal ring 400 is defined as a direction outward along the radial direction of the seal ring 400. In the embodiment shown in FIGS. 2 and 8, the first abutment portion 401 of the seal ring 400 includes the first inclined surface 411 and the second inclined surface 412. In the embodiment shown in FIG. 12, each of the first abutment portion 401 and the second abutment portion 402 includes the first inclined surface 411 and the second inclined surface 412.

Figure 11:
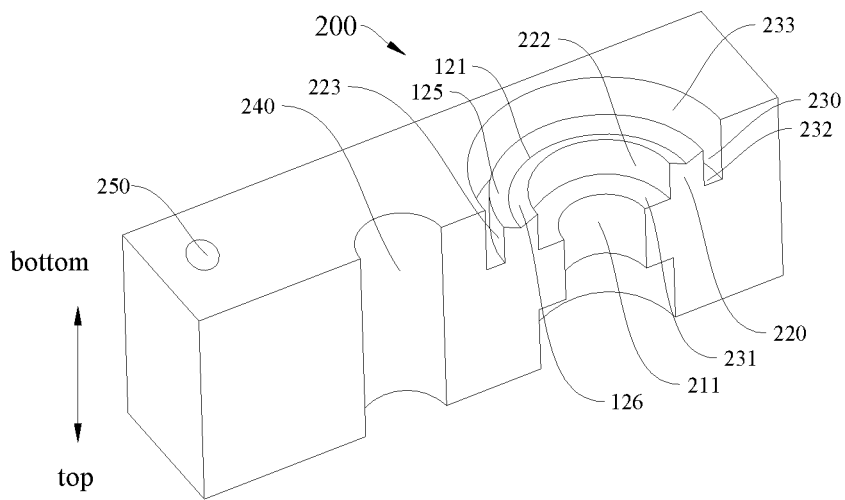
FIG. 11 is a structural perspective view of a second connection block of a pipeline adapter according to an embodiment of the present application.

As shown in FIG. 11, at least one of the second end surface 221 and the first groove bottom surface 122 has a third inclined surface 125 and a fourth inclined surface 126. The third inclined surface 125 and the fourth inclined surface 126 intersect to form the sealing groove 121. An angle formed by the third inclined surface 125 and the fourth inclined surface 126 is larger than an angle formed by the first inclined surface 411 and the second inclined surface 412. As a result, this is convenient to reduce the sealing contact area of the seal ring 400, to facilitate the elastic deformation of the seal ring 400 under pressure, and to further improve the sealing performance of the seal ring 400.

In some specific embodiments of the present application, an arc is adopted for connection transition between the first inclined surface 411 and the second inclined surface 412, so that an arc surface at the boundary of the first inclined surface 411 and the second inclined surface 412 is formed. In this embodiment, the protruding portion 410 of the seal ring 400 has an arc surface, which facilitates reducing the sealing contact area of the seal ring 400, and is prone to elastic deformation of the seal ring 400, which further improves the sealing effect of the seal ring 400.

In some specific embodiments, as shown in FIGS. 12 to 13, there are two protruding portions 410, and each of the two end surfaces of the seal ring 400 spaced apart in the axial direction has one protruding portion 410. Both the second end surface 221 and the first groove bottom surface 122 have a sealing groove 121 adapted to the shape of the protruding portions 410. In other words, as shown in FIG. 12, the upper end surface of the seal ring 400 has the first inclined surface 411 and the second inclined surface 412, and the lower end surface of the seal ring 400 also has the first inclined surface 411 and the second inclined surface 412. The second end surface 221 has the third inclined surface 125 and the fourth inclined surface 126, and the first groove bottom surface 122 also has the third inclined surface 125 and the fourth inclined surface 126. In this way, it is convenient to reduce the contact area of the seal ring 400 with the first connection block 100 and the second connection block 200, improve the elastic deformation ability of the seal ring 400, and further improve the sealing performance of the pipeline adapter 1. At the same time, it is convenient for the seal ring 400 to mate with the first connection block 100 and the second connection block 200, which can prevent the seal ring 400 from being incorrectly installed, facilitate the smooth installation of the seal ring 400, and improve the installation efficiency of the seal ring 400.

Figure 14:
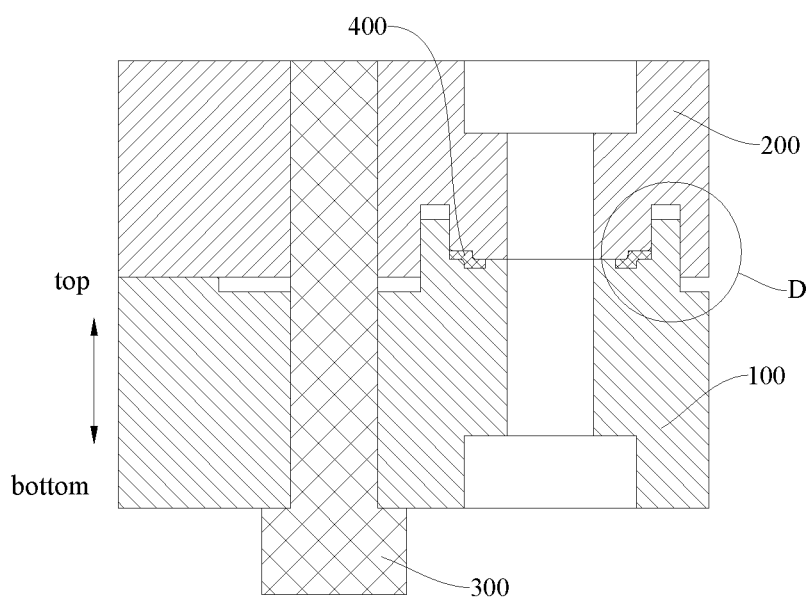
FIG. 14 is a cross-sectional view of a pipeline adapter according to another embodiment of the present application.
Figure 15:
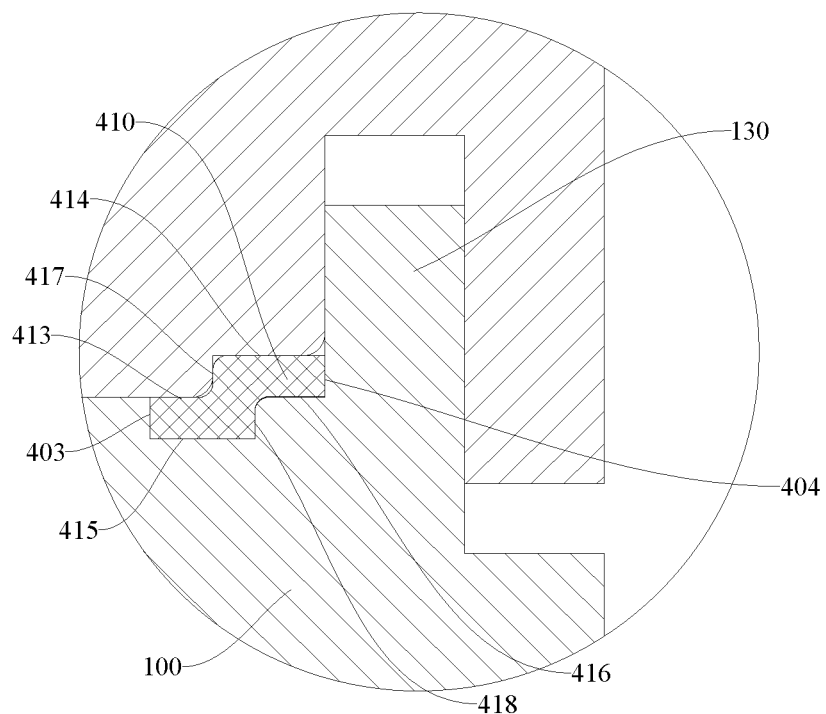
FIG. 15 is a partially enlarged view at the area D in FIG. 14.
Figure 16:
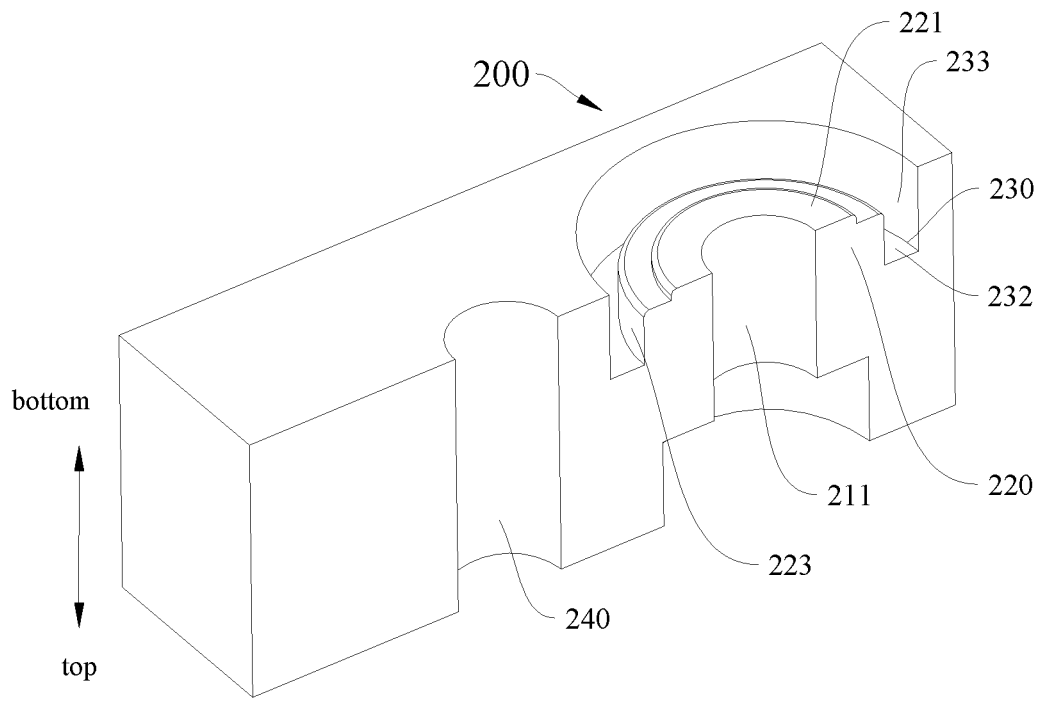
FIG. 16 is a structural perspective view of a second connection block of a pipeline adapter according to another embodiment of the present application.

In other embodiments of the present application, as shown in FIG. 14 to FIG. 16, the cross section of the seal ring 400 in the radial direction is of a stepped shape. Both the second end surface 221 and the first groove bottom surface 122 are of stepped shapes which are adapted to the end surface of the seal ring 400. The seal ring 400 includes a first tread surface 413, a second tread surface 414, a third tread surface 415, a fourth tread surface 416, a first kick surface 417 and a second kick surface 418. The inner peripheral surface (i.e., the third abutment portion 403) of the seal ring 400 is connected to the first tread surface 413 and the third tread surface 415, respectively. The first kick surface 417 is connected to the first tread surface 413 and the second tread surface 414, respectively. The outer peripheral surface (i.e., the fourth abutment portion 404) of the seal ring 400 is connected to the second tread surface 414 and the fourth tread surface 416, respectively. The second kick surface 418 is connected to the fourth tread surface 416 and the third tread surface 415, respectively. Specifically, as shown in FIG. 15, the first kick surface 417 and the second tread surface 414 of the seal ring 400 constitute a protruding portion 410, and the second kick surface 418 and the third tread surface 415 of the seal ring 400 constitute a protruding portion 410. This also facilitates reducing the contact area of the seal ring 400 with the first connection block 100 and the second connection block 200, improving the elastic deformation ability of the seal ring 400, and further improving the sealing reliability of the pipeline adapter 1.

Figure 6:
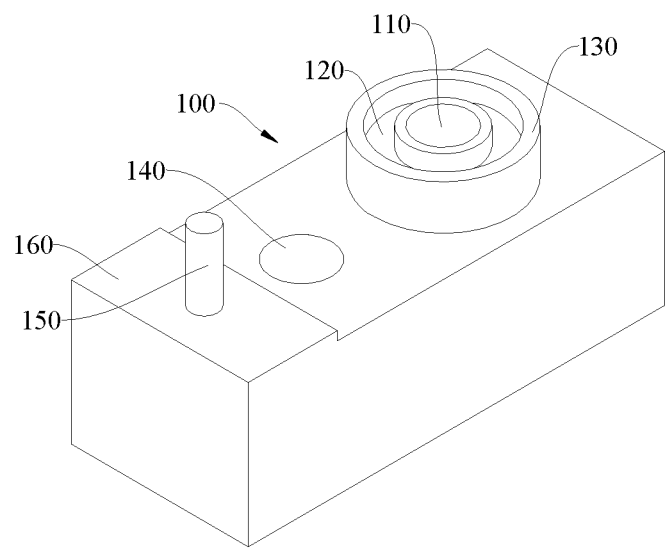
FIG. 6 is a schematic perspective view of the first connection block of the pipeline adapter according to an embodiment of the present application.
Figure 7:
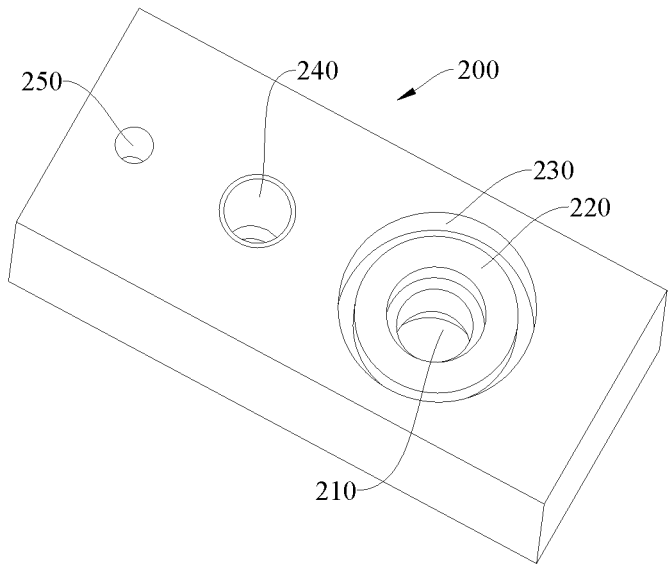
FIG. 7 is a schematic perspective view of the second connection block of the pipeline adapter according to an embodiment of the present application.
Figure 10:
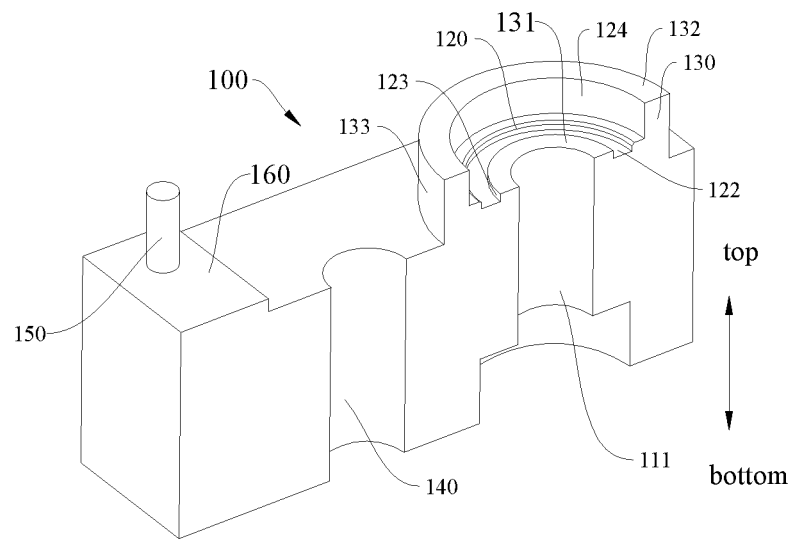
FIG. 10 is a structural perspective view of a first connection block of a pipeline adapter according to an embodiment of the present application.

In some embodiments of the present application, as shown in FIGS. 1-4, 6 and 10, a surface of the first connection block 100 facing towards the second connection block 200 is provided with the first boss 130 surrounding the first channel 110. The first annular positioning groove 120 is formed on an end surface of the first boss 130. As shown in FIGS. 1-3, 5, 7 and 11, the surface of the second connection block 200 facing towards the first connection block 100 is provided with the second groove 230 surrounding the second channel 210. The second annular positioning platform 220 is formed at the bottom wall of the second groove 230 in which the first boss 130 fits. The first inner annular portion 1301 includes a first inner top surface 131 and the first groove inner wall surface 123. The second inner annular portion 1302 includes a first outer top surface 132, a first outer wall surface 133 and the first groove outer wall surface 124. Here, it can be understood that the first inner top surface 131 and the first outer top surface 132 are spaced apart by the first annular positioning groove 120. The first inner top surface 131 forms the above-mentioned separation portion between the first groove inner wall surface 123 and the inner peripheral surface 111 of the first channel 110. Both the first inner top surface 131 and the first outer top surface 132 are ring-shaped. The first outer top surface 132 is located outside of the first inner top surface 131 along a radial direction of the first boss 130. In addition, in some specific embodiments, the first inner top face 131 and the first outer top face 132 are flush, as shown in FIGS. 4 and 6. In other specific embodiments, the first inner top surface 131 is lower than the first outer top surface 132. For example, as shown in FIG. 10, the first outer top surface 132 is spaced from the first inner top surface 131 along the radial direction of the first boss 130, and the first outer top surface 132 is located above the first inner top surface 131 along the top-to-bottom direction.

The first inner top surface 131 is connected to the inner peripheral surface 111 of the first channel 110 and the first groove inner wall surface 123, respectively. The first outer top surface 132 is connected to the first outer wall surface 133 and the first groove outer wall surface 124, respectively. The second groove 230 has a second groove inner bottom surface 231, a second groove outer bottom surface 232 and a second groove outer wall surface 233. The second groove outer bottom surface 232 is connected to the second outer wall surface 223 and the second groove outer wall surface 233, respectively. The second groove inner bottom surface 231 is connected to the inner peripheral surface 211 of the second channel 210 and the second inner wall surface 222 of the second annular positioning platform 220, respectively. The second groove outer wall surface 233 mates with the first outer wall surface 133. In the present embodiment, the second groove outer wall surface 233 abuts against the first outer wall surface 133. The first outer top surface 132 and the second groove outer bottom surface 232 are opposed to each other in the axial direction of the first channel 110 and the second channel 210. The first inner top surface 131 and the second groove inner bottom surface 231 are opposed to each other in the axial direction of the first channel 110 and the second channel 210. This not only facilitates the setting of the first annular positioning groove 120 and the second annular positioning platform 220, but also facilitates positioning and guiding the first connection block 100 and the second connection block 200 by using the first boss 130 and the second groove 230. As a result, it is convenient for the smooth assembly of the first connection block 100 and the second connection block 200, and it is convenient to improve the assembly accuracy and the assembly efficiency of the pipeline adapter 1. At the same time, the forces of the first connection block 100 and the second connection block 200 can be made more uniform, and local stress concentration can be avoided, thereby preventing one side of the first connection block 100 and the second connection block 200 from being warped.

Optionally, the first boss 130 fits in the second groove 230 with a clearance. In other words, along the axial direction of the first boss 130, there is a gap between the first inner top surface 131 of the first boss 130 and the second groove inner bottom surface 231 of the second groove 230, and/or there is a gap between the first outer top surface 132 of the first boss 130 and the second groove outer bottom surface 232 of the second groove 230.

Of course, the positions of the first annular positioning groove 120 and the second annular positioning platform 220 may be interchanged, and the positions of the first boss 130 and the second groove 230 may also be interchanged.

More specifically, the first channel 110 and the second channel 210 are coaxially disposed. The first boss 130, the first annular positioning groove 120 and the first channel 110 are coaxially disposed, and the second groove 230, the second annular positioning platform 220 and the second channel 210 are coaxially disposed. This not only facilitates the manufacture and assembly of the pipeline adapter 1, improves the structural strength and stability of the pipeline adapter 1, but also facilitates the correspondence between the first channel 110 and the second channel 210, and reduces the resistance of the medium in the pipeline so that the medium can flow smoothly.

Optionally, the second groove outer wall surface 233, the second outer wall surface 223, the second inner wall surface 222, and the inner peripheral surface 211 of the second channel 210 are arranged in parallel and spaced apart. The first outer wall surface 133, the first groove inner wall surface 123, the first groove outer wall surface 124, and the inner peripheral surface 111 of the first channel 110 are disposed in parallel and spaced apart. This can prevent the seal ring 400 from contacting the fastener 300 and prevent the seal ring 400 from being locally stressed to be damaged, which facilitating protecting the seal ring 400 and increasing the service life of the seal ring 400.

Figure 17:
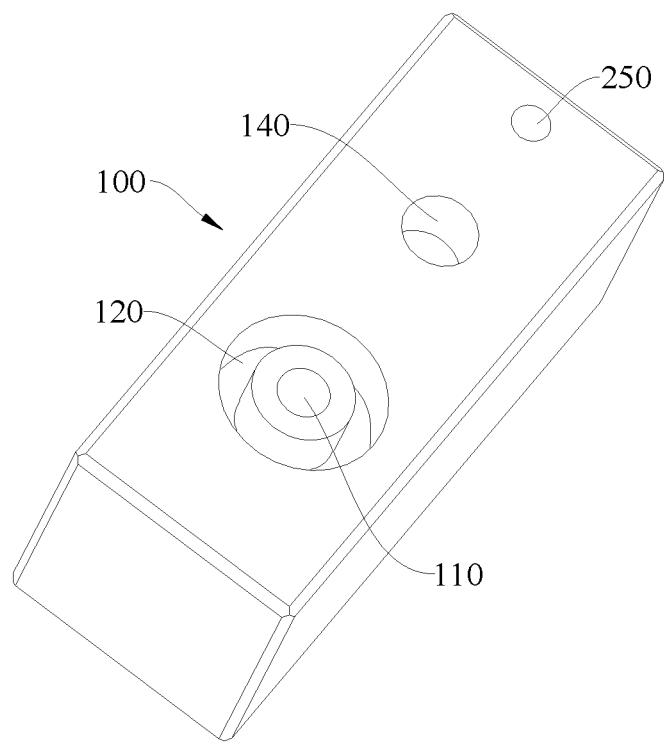
FIG. 17 is a schematic perspective view of a first connection block of a pipeline adapter according to another embodiment of the present application.
Figure 18:
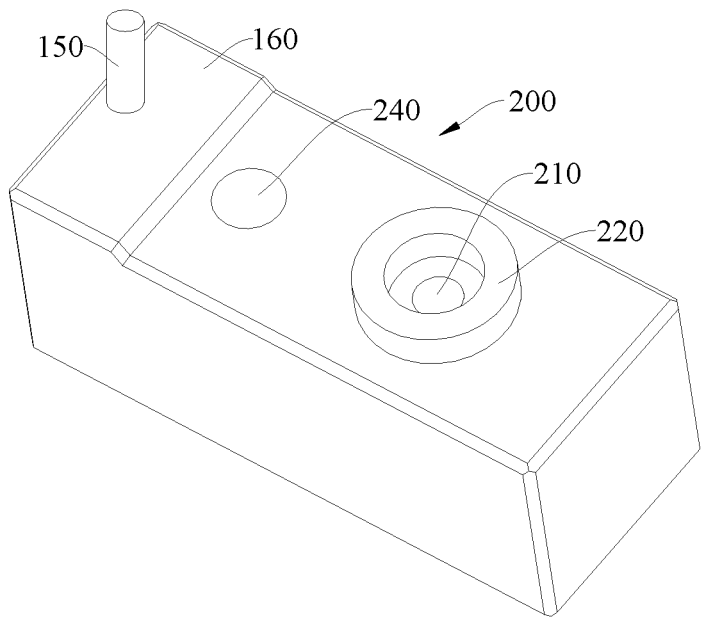
FIG. 18 is a schematic perspective view of a second connection block of a pipeline adapter according to another embodiment of the present application.

It can be understood that the first annular positioning groove 120 is not limited to the form provided in the first boss 130. For example, in other embodiments, as shown in FIG. 17 and FIG. 18, the first annular positioning groove 120 is recessed from the surface of the first connection block 100 facing towards the second connection block 200, and the second annular positioning platform 220 protrudes from a surface of the second connection block 200 facing towards the first connection block 100. In some specific embodiments, the first channel 110 and the second channel 210 are coaxially disposed, among which the first annular positioning groove 120 and the first channel 110 are coaxially disposed, and the second annular positioning platform 220 and the second channel 210 are coaxially disposed. In this way, this facilitates the manufacture and assembly of the pipeline adapter 1, improves the structural strength and stability of the pipeline adapter 1, but also facilitates the correspondence between the first channel 110 and the second channel 210, and reduces the resistance of the medium in the pipeline so that the medium can flow smoothly.

Here, it should be understood that the upper surface of the separation portion between the first groove inner wall surface 123 of the first annular positioning groove 120 and the inner peripheral surface 111 of the first channel 110 may protrude from the upper surface of the first connection block 100 toward the second connection block 200, as shown in FIGS. 4, 6 and 10. That is, the upper surface of the separation portion is higher than the upper surface of the first connection block 100. The upper surface of the separation portion between the first groove inner wall surface 123 of the first annular positioning groove 120 and the inner peripheral surface 111 of the first channel 110 may be recessed downwardly from the upper surface of the first connection block 100. In other words, the upper surface of the separation portion is lower than the upper surface of the first connection block 100. The upper surface of the separation portion between the first groove inner wall surface 123 of the first annular positioning groove 120 and the inner peripheral surface 111 of the first channel 110 may also be substantially flush with the upper surface of the first connection block 100. That is, the upper surface of the separation portion and the upper surface of the first connection block 100 are substantially equally adjacent to the second connection block 200, as shown in FIG. 17.

In some embodiments, the first connection block 100 is provided with a first through hole 140 and the second connection block 200 is provided with a second through hole 240. In other words, as shown in FIGS. 4 to 7, the first connection block 100 is provided with a first through hole 140 extending through the first connection block 100 along a top-to-bottom direction, and the second connection block 200 is provided with a second through hole 240 extending through the second connection block 200 along the top-to-bottom direction.

The fastener 300 is a bolt. The first connection block 100 and the second connection block 200 are connected by the bolt which fits in the first through hole 140 and the second through hole 240. In this way, the first connection block 100 and the second connection block 200 can be firmly installed together to ensure the reliability and stability of the fixed connection between the first connection block 100 and the second connection block 200. At the same time, the installation of the pipeline adapter 1 can be facilitated, and the disassembly and assembly efficiency of the pipeline adapter 1 can be improved, which can not only improve the production efficiency of the pipeline adapter 1, but also realize quickly disassembly when the pipeline adapter 1 fails.

In some specific embodiments, the first through hole 140 and the first channel 110 are spaced from each other and are axially consistent, and the second through hole 240 and the second channel 210 are spaced from each other and are axially consistent, thereby facilitating assembling the pipeline adapter 1 and improving the disassembly efficiency of the pipeline adapter 1.

In some embodiments, as shown in FIGS. 6, 7, 10 and 11, the second connection block 200 is provided with a positioning recess 250, and the first connection block 100 is provided with a positioning protrusion 150 that fits in the positioning recess 250. Alternatively, as shown in FIG. 17 and FIG. 18, the first connection block 100 is provided with the positioning recess 250, and the second connection block 200 is provided with the positioning protrusion 150 fitted in the positioning recess 250. Here, it can be understood that the positioning recess 250 may be a positioning hole, and the positioning protrusion 150 may be a positioning pin. The positioning pin extends into the positioning hole to perform positioning and guidance, so as to facilitate the assembly of the first connection block 100 and the second connection block 200.

In some embodiments, at least one of the first connection block 100 and the second connection block 200 is provided with a stepped portion 160. As shown in FIGS. 6 and 10, the stepped portion 160 is provided on the surface of the first connection block 100 facing towards the second connection block 200 and is spaced from the first channel 110; and/or, as shown in FIG. 18, the stepped portion 160 is provided on the surface of the second connection block 200 facing towards the first connection block 100 and spaced from the second channel 210. In other words, both the surface of the first connection block 100 facing towards the second connection block 200 and the surface of the second connection block 200 facing towards the first connection block 100 may be provided with the stepped portion 160. The stepped portion 160 is neither adjacent to the first channel 110 nor the second channel 210, or neither of the first channel 110 and the second channel 210 extend through the stepped portion 160.

In this embodiment, when the first connection block 100 and the second connection block 200 are fastened by the fastener 300, the stepped portion 160 can act as a lever to facilitate the seal ring 400 to fit between the first annular positioning groove 120 and the second annular positioning platform 220. By providing the stepped portion 160, the first connection block 100 and the second connection block 200 can be brought into abutment with the seal ring 400, thus the sealing effect can be enhanced. Here, it can be understood that "abutment" includes both the case where two objects are in contact with each other and the case where there is a force between the two objects which is orthogonal to the contact surface.

In some specific embodiments, a stepped portion 160 is provided on a surface of the first connection block 100 facing towards the second connection block 200. The stepped portion 160 is provided with a positioning protrusion 150, and a surface of the second connection block 200 facing towards the first connection block 100 is provided with a positioning recess 250 that mates with the positioning protrusion 150. For example, as shown in FIGS. 6 and 10, the upper surface of the first connection block 100 has the stepped portion 160 which is provided with a positioning pin, and the lower surface of the second connection block 200 is provided with a positioning hole to fit the positioning pin inside.

In some embodiments, the material of the first abutment portion 401 and the second abutment portion 402 of the seal ring 400 includes at least expanded graphite. The expanded graphite is a sealing material or a filler with good resilience and corrosion resistance. This further facilitates improving the working reliability of the seal ring 400 and the sealing effect of the seal ring 400. Further, the material of the third abutment portion 403 and the fourth abutment portion 404 of the seal ring 400 includes at least expanded graphite.

In some specific embodiments, the seal ring 400 is an expanded graphite gasket, that is, the seal ring 400 is made entirely of the expanded graphite.

Figure 9:
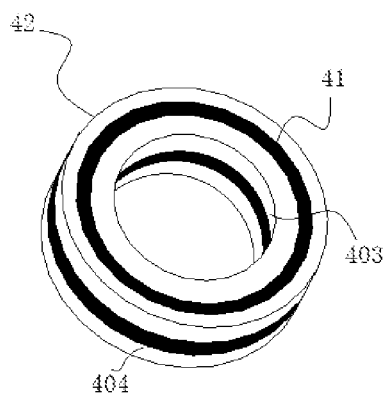
FIG. 9 is a schematic perspective view of a seal ring of a pipeline adapter according to another embodiment of the present application.

The seal ring 400 is not limited to the arrangement form of the expanded graphite gasket. For example, in other specific embodiments, as shown in FIG. 9, the seal ring 400 includes a base body 41 and a cladding layer 42 which covers a part of the outer wall surface and a part of the inner wall surface of the base body 41. In other words, the cladding layer 42 covers the base body 41. Each of the inner peripheral surface and the outer peripheral surface of the seal ring 400, as well as each of the upper end surface and the lower end surface of the seal ring 400 has the base body 41 exposed outside, so that the material of the first abutment portion 401, the second abutment portion 402, the third abutment portion 403 and the fourth abutment portion 404 of the seal ring 400 includes at least the material of the base body 41. The material of the base body 41 is expanded graphite, or a braid of expanded graphite and metal or non-metal, such as a braid of inconel wire mesh and expanded graphite, or a braid of high carbon fiber and expanded graphite, or a braid of high carbon fiber impregnated with expanded graphite emulsion, etc., which are no longer listed here one by one. The material of the cladding layer 42 is different from the material of the base body 41. The material of the cladding layer 42 may be metal, such as copper, iron or silver. Alternatively, the material of the cladding layer 42 may be non-metal, such as an engineering plastic.

The following describes an air conditioning system according to an embodiment of the present application. The air conditioning system according to the embodiment of the present application includes the pipeline adapter 1 according to the above-mentioned embodiments of the present application.

Specifically, the air conditioning system may be an air conditioning system using carbon dioxide as a refrigerant.

The air conditioning system according to the embodiment of the present application has the advantages of convenient use, good sealing effect, and the like, by using the pipeline adapter 1 according to the above embodiments of the present application.

Other configurations and operations of the air conditioning system according to the embodiments of the present application are known to those skilled in the art, and thus will not be described in detail here.

In this application, the features defined as "first" or "second" may explicitly or implicitly include one or more of the features. In the description of the present application, unless otherwise stated, "a plurality of" means two or more.

In the description of the present application, the description of the first feature being "above" or "below" the second feature may include direct contact between the first and second features, and may also include that the first and second features are not in direct contact, but are contacted with each other through another feature between the first and second features.

In the description of the present application, the description of the first feature being "above", "on top of" and "upper" the second feature includes the fact that the first feature is directly above and obliquely above the second feature, or merely indicates that the horizontal height of the first feature is higher than the second feature.

In the description of this application, it should be noted that the terms "installed", "connected" and "communicated" should be understood in a broad sense unless otherwise specified and limited. For example, it can be a fixed connection, a detachable connection or an integral connection; it can be a mechanical connection or an electrical connection; it can be a direct connection or an indirect connection through an intermediate medium; or it can be an internal communication of two components. For those of ordinary skill in the art, the specific meanings of the above terms in this application can be understood in specific situations.

In the description of this specification, the description with reference to the terms "an embodiment", "some embodiments", "exemplary embodiments", "examples", "specific examples", or "some examples" etc., means that a specific feature, structure, material or feature described in conjunction with the embodiment or example is included in at least one embodiment or example of the present application. In this specification, the schematic expressions of the above terms do not necessarily refer to the same embodiment or example. Furthermore, the particular features, structures, materials, or characteristics described may be combined in any suitable manner in any one or more embodiments or examples.

Although the embodiments of the present application have been shown and described, those of ordinary skill in the art can understand that various changes, modifications, replacements and variations can be made to these embodiments without departing from the principles and spirit of the application, the scope of the present application is defined by the claims and their equivalents.

What is claimed is:

1. A pipeline adapter applicable in a refrigeration system, comprising:
   a first connection block comprising a first top surface, a first bottom surface opposite to the first top surface, a first boss protruding from the first top surface along a bottom-to-top direction, the first boss having an upper surface and a first annular positioning groove recessed downwardly from the upper surface, the first connection block having a first groove bottom surface inside the first annular positioning groove; the first connection block defining a first channel extending through the first bottom surface and the upper surface along the bottom-to-top direction, the first boss being separated by the first annular positioning groove to form a first inner annular portion and a first outer annular portion, the first inner annular portion, the first annular positioning groove and the first outer annular portion being disposed in sequence along a radial direction of the first channel, the first annular positioning groove being separated from the first channel along the radial direction of the first channel by the first inner annular portion;
   a second connection block comprising a second top surface, a second bottom surface opposite to the second top surface, an intermediate surface located between the second top surface and the second bottom surface, a second channel extending through the second top surface and the intermediate surface, a second groove recessed upwardly from the second bottom surface along the bottom-to-top direction, and a second annular positioning platform protruding from the intermediate surface; the intermediate surface being located between the second top surface and the second bottom surface along a top-to-bottom direction; the second channel extending through the second top surface and the intermediate surface along the top-to-bottom direction; the second annular positioning platform extending into the second groove along the top-to-bottom direction; the second connection block comprising a wall portion surrounding the second groove; the second annular positioning platform comprising a second end surface which is located between the intermediate surface and the second bottom surface along the top-to-bottom direction; the second groove being separated by the second annular positioning platform to form an inner channel which communicates with the second channel along the bottom-to-top direction and a second annular positioning groove which is formed between the wall portion and the second annular positioning platform; the second annular positioning platform, the second annular positioning groove and the wall portion being disposed in sequence along a radial direction of the inner channel;
   a fastener which connects the first connection block and the second connection block; and
   a seal ring fitted between the first annular positioning groove and the second annular positioning platform along the top-to-bottom direction, the seal ring comprising at least a first abutment portion and a second abutment portion, the first abutment portion and the second abutment portion being disposed on opposite sides of the seal ring along the top-to-bottom direction, the first groove bottom surface at least partially abutting against the first abutment portion, and the second end surface at least partially abutting against the second abutment portion;
   wherein materials of the first abutment portion and the second abutment portion include at least expanded graphite;
   wherein the first boss of the first connection block is received in the second groove of the second connection block, the first outer annular portion is at least partially inserted in the second annular positioning groove, the second annular positioning platform is at least partially inserted in the first annular positioning groove, and the first inner annular portion is at least partially received in the inner channel; and wherein the first inner annular portion is located inside the second annular positioning platform, and the first inner annular portion abuts against the second annular positioning platform along the radial direction of the inner channel to prevent the expanded graphite from entering the first channel and/or the second channel.

2. The pipeline adapter according to claim 1, wherein the seal ring comprises a protruding portion extending in a circumferential direction of the seal ring, at least one of the second end surface and the first groove bottom surface has a sealing groove, and the sealing groove is adapted to a shape of the protruding portion.

3. The pipeline adapter according to claim 2, wherein at least one of the first abutment portion and the second abutment portion comprises a first inclined surface and a second inclined surface, the first inclined surface intersecting with the second inclined surface to form the protruding portion, the first inclined surface extending obliquely outward from an inner peripheral surface of the seal ring in an axial direction of the seal ring and extending obliquely outward from the inner peripheral surface of the seal ring in a radial direction of the seal ring, the second inclined surface extending obliquely outward from an outer peripheral surface of the seal ring in the axial direction of the seal ring and extending obliquely inward in the radial direction of the seal ring, at least one of the second end surface and the first groove bottom surface having a third inclined surface and a fourth inclined surface, the third inclined surface and the fourth inclined surface intersecting to form the sealing groove, and an angle formed by the third inclined surface and the fourth inclined surface being greater than an angle formed by the first inclined surface and the second inclined surface.

4. The pipeline adapter according to claim 3, wherein an arc is adopted for connection transition between the first inclined surface and the second inclined surface, so that an arc surface at the boundary of the first inclined surface and the second inclined surface is formed.

5. The pipeline adapter according to claim 2, wherein two protruding portions are respectively provided on two end surfaces of the seal ring, the two end surfaces being spaced apart along the axial direction of the seal ring, both the second end surface and the first groove bottom surface having the sealing groove adapted to the shape of the protruding portions.

6. The pipeline adapter according to claim 1, wherein the first annular positioning groove is disposed surrounding the first channel, the first connection block comprises a first groove inner wall surface and a first groove outer wall surface, the first groove bottom surface is connected to the first groove inner wall surface and the first groove outer wall surface, the first annular positioning groove is bounded by the first groove inner wall surface, the first groove outer wall surface and the first groove bottom surface; and wherein the second channel communicates with the first channel, the second annular positioning platform is disposed surrounding the second channel, the second annular positioning platform has a second inner wall surface and a second outer wall surface, the second end surface is connected to the second inner wall surface and the second outer wall surface, the second outer wall surface abuts against the first groove outer wall surface, and the second inner wall surface abut against the first groove inner wall surface.

7. The pipeline adapter according to claim 6, wherein the first inner annular portion comprises a first inner top surface and the first groove inner wall surface, the first outer annular portion comprises a first outer top surface and a first outer wall surface, the first inner top surface is connected to an inner peripheral surface of the first channel and the first groove inner wall surface, respectively; the first outer top surface is connected to the first outer wall surface and the first groove outer wall surface, respectively; the second connection block comprises a second groove inner bottom surface, a second groove outer bottom surface and a second groove outer wall surface, the second groove outer bottom surface is connected to the second outer wall surface and the second groove outer wall surface, respectively; the second groove inner bottom surface is connected to an inner peripheral surface of the second channel and the second inner wall surface of the second annular positioning platform, respectively; the second groove outer wall surface abuts against the first outer wall surface; the first outer top surface and the second groove outer bottom surface are opposed to each other in an axial direction of the first channel and the second channel; the first inner top surface and the second groove inner bottom surface are opposed to each other in the axial direction of the first channel and the second channel.

8. The pipeline adapter according to claim 7, wherein the second groove outer wall surface, the second outer wall surface, the second inner wall surface and the inner peripheral surface of the second channel are arranged in parallel and spaced apart from each other; and the first outer wall surface, the first groove inner wall surface, the first groove outer wall surface and the inner peripheral surface of the first channel are disposed in parallel and spaced apart from each other.

9. The pipeline adapter according to claim 1, wherein the first connection block has a first through hole, the second connection block has a second through hole, the fastener is a bolt, the first connection block and the second connection block are connected by the bolt which fits in the first through hole and the second through hole, the first through hole and the first channel are spaced from each other and are axially consistent, and the second through hole and the second channel are spaced from each other and are axially consistent.

10. The pipeline adapter according to claim 1, wherein at least one of the first connection block and the second connection block is provided with a stepped portion, the stepped portion being provided on a surface of the first connection block facing towards the second connection block and is spaced from the first channel; and/or, the stepped portion being provided on a surface of the second connection block facing towards the first connection block and spaced from the second channel.

11. The pipeline adapter according to claim 1, wherein the first connection block is provided with a positioning recess, and the second connection block is provided with a positioning protrusion fitted in the positioning recess, the positioning protrusion is integral with the second connection block; or the second connection block is provided with a positioning recess, and the first connection block is provided with a positioning protrusion fitted in the positioning recess, the positioning protrusion is integral with the first connection block.

12. The pipeline adapter according to claim 1, wherein a stepped portion is provided on a surface of the first connection block facing towards the second connection block, the stepped portion is provided with a positioning protrusion which is integral with the first connection block, and a surface of the second connection block facing towards the first connection block is provided with a positioning recess that mates with the positioning protrusion.

13. A pipeline adapter applicable in a refrigeration system for connecting a first pipeline and a second pipeline, the pipeline adapter comprising:
a first connection block comprising a first boss and a first channel extending through the first boss, the first channel being connected to the first pipeline, the first boss defining a first annular positioning groove surrounding the first channel, the first connection block comprising a first groove bottom surface which is located at a bottommost of the first annular positioning groove; the first boss being separated by the first annular positioning groove to form a first inner annular portion and a first outer annular portion, the first inner annular portion, the first annular positioning groove and the first outer annular portion being disposed in sequence along a radial direction of the first channel, the first annular positioning groove being separated from the first channel along the radial direction of the first channel by the first inner annular portion;
a second connection block comprising a second channel, a second groove communicating with the second channel and a second annular positioning platform extending into the second groove; the second channel being connected to the second pipeline and in communication with the first channel; the second annular positioning platform being disposed surrounding the second channel; the second connection block comprising a wall portion surrounding the second groove; the second annular positioning platform comprising a second end surface; the second groove being separated by the second annular positioning platform to form an inner channel which communicates with the second channel and a second annular positioning groove which is formed between the wall portion and the second annular positioning platform; the second annular positioning platform, the second annular positioning groove and the wall portion being disposed in sequence along a radial direction of the inner channel; and
a seal ring fitted between the first annular positioning groove and the second annular positioning platform, the seal ring comprising at least a first abutment portion and a second abutment portion, the first abutment portion and the second abutment portion being disposed on opposite sides of the seal ring, the first groove bottom surface at least partially abutting against the first abutment portion, and the second end surface at least partially abutting against the second abutment portion;
wherein materials of the first abutment portion and the second abutment portion include at least expanded graphite;
wherein the first boss of the first connection block is received in the second groove of the second connection block, the first outer annular portion is at least partially inserted in the second annular positioning groove, the second annular positioning platform is at least partially inserted in the first annular positioning groove, and the first inner annular portion is at least partially received in the inner channel; and
wherein the first inner annular portion is located inside the second annular positioning platform, and the first inner annular portion abuts against the second annular positioning platform along the radial direction of the inner channel to prevent the expanded graphite from entering the first channel and/or the second channel.

14. The pipeline adapter according to claim 13, wherein at least one of the first connection block and the second connection block is provided with a stepped portion, the stepped portion being spaced from the first channel and the second channel, the stepped portion acting as a lever to facilitate the seal ring to fit between the first annular positioning groove and the second annular positioning platform.

15. The pipeline adapter according to claim 13, wherein the seal ring comprises a protruding portion extending in a circumferential direction of the seal ring, at least one of the second end surface and the first groove bottom surface has a sealing groove which is adapted to a shape of the protruding portion.

16. The pipeline adapter according to claim 15, wherein two protruding portions are respectively provided on two end surfaces of the seal ring, the two end surfaces are spaced apart along an axial direction of the seal ring, both the second end surface and the first groove bottom surface have the sealing groove adapted to the shape of the protruding portion.

17. The pipeline adapter according to claim 15, wherein at least one of the first abutment portion and the second abutment portion comprises a first inclined surface and a second inclined surface, the first inclined surface intersecting with the second inclined surface to form the protruding portion, at least one of the second end surface and the first groove bottom surface having a third inclined surface and a fourth inclined surface, the third inclined surface and the fourth inclined surface intersecting to form the sealing groove, an angle formed by the third inclined surface and the fourth inclined surface being greater than an angle formed by the first inclined surface and the second inclined surface.

18. The pipeline adapter according to claim 17, wherein the seal ring comprises an arc configured for connection transition between the first inclined surface and the second inclined surface, so that an arc surface at the boundary of the first inclined surface and the second inclined surface is formed.

19. The pipeline adapter according to claim 13, wherein the first connection block is provided with a positioning recess, and the second connection block is provided with a positioning protrusion fitted in the positioning recess, the positioning protrusion is integrally formed with the first connection block; or
the second connection block is provided with a positioning recess, and the first connection block is provided with a positioning protrusion fitted in the positioning recess, the positioning protrusion is integrally formed with the second connection block.

20. The pipeline adapter according to claim 13, wherein the first connection block has a first through hole, the second connection block has a second through hole, the pipeline adapter comprises a bolt which fits in the first through hole and the second through hole to connect the first connection block and the second connection block, the first through hole and the first channel are spaced from each other and are axially consistent, and the second through hole and the second channel are spaced from each other and are axially consistent.

* * * * *